United States Patent Office 3,565,781
Patented Feb. 23, 1971

3,565,781
PROCESS FOR ELECTRODEPOSITING A POLYOL ESTERIFIED OIL BASED COATING
Robert D. Jerabek, Glenshaw, Pa., assignor to PPG Industries, Inc., Pittsburgh, Pa., a corporation of Pennsylvania
No Drawing. Filed Apr. 22, 1965, Ser. No. 450,205
Int. Cl. B01k 5/02; C23b 13/00
U.S. Cl. 204—181                                8 Claims

ABSTRACT OF THE DISCLOSURE

Improved coating compositions comprise as the resinous vehicle a drying oil fatty acid ester-acid anhydride reaction product which is partially esterified with a polyol, preferably a diol such as 2,2-bis(4-hydroxycyclohexyl)propane. Such compositions, when partially neutralized and dispersed in water, are advantageously applied by an electrodeposition process and provide increased throwing power and ease of application at higher voltages.

---

This invention relates to modified drying oil based coating compositions adapted for use in electrodepositioning films thereof on metals, and to the methods whereby such compositions are produced and electrodeposited.

Electrodeposition of certain materials and the methods used for electrodepositing coatings have been known for some time. However, the types of materials heretofore used in electrodeposition processes have been necessarily limited because it is difficult to achieve compositions which form coatings having satisfactory properties when applied in this manner. Among the most troublesome problems in depositing such compositions are the necessity for controlling voltages to avoid rupturing the film, and low throwing power. By "throwing power" is meant that property whereby different areas of the electrode to be coated receive substantially the same density of deposit, even though they are at appreciably different distances from the other electrode.

It has recently been discovered that certain specific coating compositions possess very desirable properties when used in electrodeposition processes, and that the coatings obtained have excellent properties and can be applied easily and efficiently on a large scale. These coating compositions include those in which the vehicle comprises the partially neutralized reaction product of a drying oil fatty acid ester and an alpha, beta-ethylenically unsaturated dicarboxylic acid or an anhydride of such an acid; the reaction product may also contain one or more other ethylenically unsaturated monomers. Many of these compositions are disclosed in copending application Serial No. 222,674, filed Sept. 10, 1962 now U.S. Patent 3,366,-563.

It has been further discovered that such fatty acid ester reaction products have certain improved properties when employed in electrodeposition processes if the acidic component is partially esterified with a monohydric alcohol prior to neutralization of all or part of the remaining acidic groups. These compositions, disclosed in copending application, Serial No. 282,880, filed May 24, 1963 now U.S. Patent 3,369,983, provide better flow properties on baking and other advantages, and have lower viscosities and are thus easier to formulate and handle.

It has now been found that still further improved properties are attained by partially esterifying the acidic component of a drying oil fatty acid ester-acid anhydride reaction product with a polyol, preferably a diol. Whereas heretofore it had been thought desirable to provide lower viscosity compositions, the products herein are of increased viscosity and lowered acidity; these seeming disadvantages, however, are more than offset by the increased throwing power and ease of application at higher voltages attained by these compositions. In addition to these improved properties, the products herein also provide harder films and are more easily pigmented, as well as exhibiting the other desirable characteristics necessary in protective coating compositions.

Many of the foregoing advantages are particularly important with respect to electrodeposited coatings. For this reason, and because the suitability of coating compositions for electrodeposition is both unpredictable and difficult to achieve, emphasis is placed herein upon the applicability of the compositions of this invention to electrodeposition processes. However, it should be noted that these compositions can also be applied by any conventional means, such as by brushing or rolling. Because they are water-dispersible, their application by dipping and their use, for example, as a dip primer, is advantageous in many instances, giving increased salt-spray resistance and other improved properties. Thus, it is not intended that the invention be limited by the discussion and examples herein relating to electrodeposition, although the usefulness of these compositions in such processes makes them especially valuable.

The improved compositions of the present invention comprise a modified reaction product or adduct of a drying oil fatty acid ester with a dicarboxylic acid anhydride. By "drying oil fatty acid esters" are meant esters of fatty acids which are or can be derived from drying oils or from such sources as tall oil, and which contain at least a portion of polyunsaturated fatty acids. Preferably, the drying oil per se is employed. Generally, drying oils are those oils which have an iodine value of about 90 or above, as determined by method ASTM-D1467-57T (thus including so-called "semi-drying oils"). Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil and the like.

Also included among such esters are those in which the esters themselves are modified with other acids, including saturated, unsaturated or aromatic acids, such as butyric acid, stearic acid, linoleic acid, phthalic acid, isophthalic acid, terephthalic acid or benzoic acid, or an anhydride of such an acid. One inexpensive acid material which has been found to produce good results in many instances is rosin, which is composed of chiefly abietic acid and other resin acids.

The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols, such as trimethylolethane, trimethylolpropane, pentaerythritol, sorbitol and the like. If desired, the esters can also be modified with monomers such as styrene or cyclopentadiene, or with resins containing residual unsaturation, such as polymerized or partially polymerized cyclopentadiene. Similarly, other esters of unsaturated fatty acids, for example, those prepared by the esterification of tall oil fatty acids with polyols, are also useful.

Also included among the drying oil fatty acid esters are alkyd resins prepared utilizing semi-drying or drying oils; ester of epoxides with such fatty acids, including esters of diglycidyl ethers of polyhydric compounds as well as other mono-, di- and polyepodixes; semi-drying or drying oil fatty acid esters of polyols, such as butanediol, trimethylolethane, trimethylolpropane, trimethylolhexane, pentaerythritol and the like; and semi-drying or drying fatty acid esters of resinous polyols, such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the products described herein, provided the resultant product contains anhydride groups. These include such anhydrides as maleic anhydride, itaconic anhydride and other similar anhydrides. Instead of the anhydride, there may also be used ethylenically unsaturated dicarboxylic acids which form anhydrides, for example, maleic acid or itaconic acid. These acids appear to function by first forming the anhydride. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of the nonconjugated double bonds such as are present in linseed oil, the reaction may take place with the methylene group adjacent the nonconjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of the fatty acid ester and the dicarboxylic acid or anhydride, in many instances it is desirable to incorporate into the reaction product another ethylenically unsaturated monomer. For this purpose, any ethylenically unsaturated monomer, preferably containing a single $CH_2{=}C{<}$ group, can be employed. Examples of such monomers include monoolefinic and diolefinic hydrocarbons, such as styrene, vinyl toluene, butadiene-1,3,cyclopentadiene and the like; halogenated monoolefinic and diolefinic hydrocarbons, such as alpha-chlorostyrene, chlorobutadiene and similar compounds; esters of organic and inorganic acids, such as vinyl acetate, methyl methacrylate, butyl acrylate, isopropenyl acetate, allyl chloride, allyl cyanide, dibutyl itaconate, ethyl alphachloroacrylate, and diethyl maleate; organic nitriles, such as acrylonitrile, methacrylonitrile and ethylacrylonitrile; and the like. A preferred class of monomers used can be described by the formula:

(I) 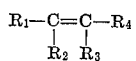

where $R_1$ and $R_2$ are hydrogen or alkyl, $R_3$ is hydrogen, alkyl or carboxyalkyl, and $R_4$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitrile.

The ester-acid or anhydride adduct can also be modified with ethylenic resins, i.e., polymerized or partially polymerized materials containing residual ethylenic unsaturation. For example, the adduct can be modified with a hydrocarbon resin such as a cyclopentadiene resin; these are made from cyclopentadiene, dicyclopentadiene, methylcyclopentadiene, etc. (often from a mixture of these) and may be added to the ester or adduct in monomeric or dimeric form, and further polymerized on contact therewith, or the polymer or partial polymer can be employed. Other ethylenic resins include partially polymerized mixed olefin petroleum fractions, and the like. For purposes of the present invention, such dimers or resinous materials are considered as additional ethylenic monomers.

The reaction of the fatty acid ester, the acid or anhydride, and any additional unsaturated modifying materials can be carried out concurrently, that is, with each of the components of the reaction product being mixed together and heated to reaction temperature, or the fatty acid ester can be reacted first with monomer and then with the acidic component. However, because ethylenic monomers and the acid or anhydride may be reactive with each other, the oil or other fatty acid ester is in most instances preferably first reacted with the acid or acid anhydride, and then this product is subsequently reacted with an ethylenically unsaturated monomer or monomers at somewhat lower temperatures, e.g., between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed.

If an additional ethylenic monomer (or ethylenic resin) is incorporated in the reaction product, it is typically used in amounts between about 5 percent and about 50 percent by weight based upon the total weight of acid or anhydride and ester, with between 10 percent and 35 percent being used in those products preferred. Thus, in most instances, the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length and contain recurrent anhydride groups derived from the dicarboxylic acid or anhydride. The improved compositions of the present invention are obtained by reacting the recurrent anhydride groups with a polyol.

The reaction with the polyol results in increased viscosity, presumably due at least in part to some crosslinking. However, it is important to prevent gelation, that is, to provide an ungelled product. It may be noted that in many cases incipient gel formation can be controlled or reversed by addition of a monohydride alcohol.

Essentially any polyol can be employed, but diols are greatly preferred. When higher polyols, such as trimethylolpropane, glycerol, pentaerythritol and the like are utilized, they are employed in small amounts, or in conjunction with a diol, or in the presence of a monohydric alcohol, and are used with adducts having a relatively low proportion of acidic component. The various diols that can be employed include, for example, ethylene glycol, 1,2-propylene glycol, 1,4-butanediol, 1,5-pentanediol, 2-methyl-2-n-propyl-1,3-propanediol, and similar higher or substituted alkylene glycols, containing up to about 20 carbon atoms or more. Glycol ethers may also be employed such as diethylene glycol, triethylene glycol, poly (oxytetramethylene)glycols and the like, those having molecular weights of up to about 400 being most useful. Water-insoluble diols are often preferable, and especially desirable water-dispersed compositions for electrodeposition are obtained using 2,2-bis(4-hydroxycyclohexyl)propane (which has given the best results), neopentyl glycol, 1,1' - isopropylidenebis - (p - phenyleneoxy)di-2-propanol, and similar diols.

The proportions of polyol and ester-anhydride adduct that are employed depend upon various factors, but are in general limited only by the need to avoid gelation of the product. The total functionality of the reactants is a guide to determining the optimum proportions to be employed, and in most instances should be not greater than about 2. By total functionality is meant the total number of anhydride and hydroxyl groups divided by the total number of molecules of polyol and adduct. The numbers involved are, of course, average figures, and obviously many factors are taken into consideration in determining functionality, these being well known in the art. When monomeric constituents are used, their functionality is relatively easily determined; but with resinous products such as the adducts herein, not only the proportion of anhydride in the adduct but also the bodying effect due to heating and similar considerations should be taken into account. In any event, one can easily determine whether any particular combination of reactants results in a gelled product, and as mentioned above, gelation can often be reversed by adding a monohydric alcohol.

In most instances, the reaction products herein are made from about 65 percent to about 98 percent of ester-anhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the half-ester of the dicarboxylic acid anhydride moieties present preferentially obtained before the full ester begins to be formed. In addition, production of the full ester generally requires more stringent conditions, such as higher temperatures, even when an excess of hydroxyl groups are present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus it is preferred to heat the reaction mixture moderately, i.e., to about 80° C. or higher. The preferred maximum temperature is that at which the full ester begins to be formed, which varies with the particular polylol and which is in most cases about 180° C., but higher temperatures, up to about 300° C. can be used if desired, for example, when the number of hydroxyl groups present does not exceed the number of anhydride groups present.

When the reaction is carried out as described, the product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially esterified product with a base.

Inoragnic bases, such as metal hydroxides or quaternary ammonium hydroxides, can be used, but organic bases, such as amines, are preferred. Included within the term "amines" is ammonia, and in many cases ammonia is the preferred neutralizing base. Also quite effective is any primary, secondary or tertiary amine, including, for example, alkyl amines such as methylamine, ethylamine, propylamine, butylamine, amylamine, dimethylamine, diethylamine, dipropylamine, dibutylamine, triethylamine and N-methylbutylamine; cycloalkyl amines, such as cyclohexylamine; unsaturated amines, such as allyl amine, 1,2-dimethylpentenylamine and pyrrole; arylamines, such as aniline; aralkylamines, such as benzylamine and phenethylamine; alkarylamines, such as m-toluidine; cyclic amines, such as morpholine, N-methyl morpholine, N-ethyl morpholine, pyrrolidine and piperidine; diamines such as hydrazine, methylhydrazine, 2,3-toluene-diamine, ethylenediamine, 1,2-naphthylene diamine and piperazine; and substituted amines, such as histamine, hydroxylamine, ethanolamine, diethyl ethanolamine, diethanolamine and triethylanolamine. In some instances, there are employed both diamine and ammonia or one of the other foregoing amines, or part of the neutralizing base may comprise an amine such as an amino-alkylalkanediol, for example, 2-methyl-2-amino-1,3-propanediol, or 2-methyl-2-amino-1,4-butanediol.

All or part of the remaining acidity of the product after the reaction with the polyol is carried out can be neutralized. The extent of neutralization depends to some degree upon the proportion of acidic groups that have been reacted with the polyol; the higher the level of this esterification, the larger the proportion of the remaining acidity which should be neutralized. Generally, at least about 10 percent of the remaining acidity should be neutralized, and preferably at least about 25 percent is neutralized. The neutralization reaction is accomplished by mixing the neutralizing base with the partially esterified product. A water solution or other solution of the base may be used if desired, and moderately elevated temperatures are often employed.

When used in electrodeposition processes, the foregoing products can be employed as such in water dispersion to electrodeposit clear films, but ordinarily they are used as a vehicle along with a pigment composition. The pigment composition used may be of any convenitonal type, comprising, for example, iron oxides, lead oxides, strontium chromate, carbon black, titanium dioxide, talc, barium sulfate and the like, as well as combinations of these and similar pigments. Color pigments, such as cadmium yellow, cadmium red, phthalocyanine blue, chromic yellow, toluidine red, hydrated iron oxide and the like, may be included if desired, as may be dispersing or surface-active agents, which should be a nonionic or anionic type, or a combination of these types.

Usually the pigment and the surface-active agent, if any, are ground together in a portion of the vehicle to make a paste, and this is blended with the vehicle to produce the coating composition. There may also be included in the coating composition additives, such as antioxidants, wetting agents, driers, anti-foaming agents, bactericides, suspending agents, and the like.

It has been found that in most instances desirable coatings are obtained using pigmented compositions containing ratios of pigment-to-vehicle of not higher than about 1.5 to 1, and preferably not higher than about 1 to 1. If the composition has too high a pigment-to-vehicle ratio, the electrodeposited film may exhibit poor flow characteristics.

In formulating water-dispersed compositions, ordinary tap water may be employed. However, such water may contain a relatively high level of cations which, while not ordinarily rendering the process inoperative, may result in variations in the properties of the bath when used for electrodeposition. In such cases, it is often desirable to utilize deionized water from which free ions have been removed, as by passages through an ion exchange resin.

The compositions as described above can be applied in any conventional manner, but they are especially adapted to electrodeposition. In electrodeposition processes utilizing these coating compositions, the aqueous bath containing the composition is placed in contact with an electrically conductive anode and an electrically conductive cathode. The coating is deposited upon the anode, so that the substrate to be coated is used as the anode. It may be of any electrically conductive metal, such as iron, steel, aluminum, galvanized steel, phosphatized steel, zinc, copper and other metals, as well as other surfaces made conductive by application of a conductive coating or layer. Upon the passage of electric current between the anode and the cathode, while in contact with the bath containing the coating composition, an adherent film of the coating composition is deposited upon the anode.

Generally speaking, the conditions under which the electrodeposition process is carried out are those conventionally used in the electrodeposition methods employed heretofore. The applied voltage may be varied greatly, and can be very low, e.g., 1 volt, or very high, e.g., several thousand volts or even higher. For pigmented systems, it is typically between 50 volts and 500 volts. A particular advantage of the products herein is that they permit the use of higher voltages without the problems usually encountered; thus they are often electrodeposited at from about 200 volts to about 375 volts.

It is desirable that the pH of the coating composition be as low as possible, consistent with the desired level of neutralization, and preferably under about 8. There is a correlation between the extent of neutralization and the pH of the neutralized product, so that measurement of pH provides a convenient method of determining the approximate extent to which neutralization has taken place. However, the pH for any given level of neutralization varies with the nature of the components of the coating composition, that is, with the particular vehicle and pigment composition included therein. The nature of the polyol in the product also affects the pH; the longer the chain length of the polyol employed, the higher the pH desired. The presence of an additional unsaturated monomer also increases the preferred pH level.

The problem of increased pH encountered in baths employed in continuous electrodeposition may be overcome by the addition of unneutralized or only slightly neutralized product to the baths, which lowers the pH without affecting the advantageous properties of the composition.

The concentration of the coating composition in the aqueous bath used in electrodeposition is not critical and relatively high levels of the coating composition can be used. However, it is ordinarily desirable to use as low a concentration of coating composition as will give satisfactory results; aqueous baths containing as little as about 1 percent by weight of the coating composition can be employed, and it is preferred not to use more than about 30 percent by weight of the coating composition in the bath.

Electrodeposition produces an adherent film which is very high in solids content, often 80 percent to 90 percent or even higher, which provides the important advantage that the film will not readily run or wash. Although the article so coated can be used, if desired, without additional baking or other drying procedures, additional baking or drying of the film is easily accomplished inasmuch as there is little or no solvent to be evaporated from the film. Ordinarily, the coated article is baked at temperatures of about 100° C. to 200° C. for about 10 minutes to 30 minutes.

Several examples of the method and practice of the invention follow, but are not to be construed as limiting its scope. All parts and percentages are by weight unless otherwise specified.

EXAMPLE 1

A mixture of 2700 parts of linseed oil and 300 parts of maleic anhydride were heated with agitation in a glass flask equipped with an electric heating mantle and fitted with condenser, agitator, inert gas inlet tube and thermometer. In approximately one hour, the mixture reached 222° C. and was held at this temperature for another hour, after which the reaction mixture was sparged with inert gas for 10 minutes and cooled. The maleinized linseed oil had a viscosity of 470 centipoises at 25° C.

A mixture of 1000 parts by weight of the product thus obtained and 108 parts of 2,2-bis(4-hydroxycyclohexyl)propane was heated to 170° C. with agitation in approximately 30 minutes. After another 30 minutes at 170° C. the reaction mixture was cooled. The product obtained had a viscosity of 29,500 centipoises at 25° C.

EXAMPLE 2

Example 1 was repeated, except that the 2,2-bis(4-hydroxycyclohexyl)propane employed therein was replaced by 45.5 parts of trimethylolpropane. The partial ester obtained had a viscosity of 38,000 centipoises at 25° C.

EXAMPLE 3

Example 1 was repeated using in place of the 2,2-bis(4-hydroxycyclohexyl)propane therein, 53 parts of neopentyl glycol. The viscosity of the resultant partial ester was 5000 centipoises at 25° C.

EXAMPLE 4

In the manner of Example 1, 2640 parts of linseed oil were treated with 360 parts of maleic anhydride, yielding a maleinized linseed oil having a viscosity of 925 centipoises at 25° C. To 1000 parts of this product there were added 105 parts of trimethylolpropane monoallyl ether, and this mixture was heated at 170° C. for 1 hour. The product had a viscosity of 11,500 centipoises at 25° C.

EXAMPLE 5

In the manner of Example 1, 2400 parts of linseed oil were reacted with 600 parts of maleic anhydride, yielding a maleinized linseed oil with a viscosity of 28,500 centipoises at 25° C. A mixture of 2500 parts of this product and 75 parts of 2,2-bis(4-hydroxycyclohexyl)propane were reacted as in Example 1, yielding a partial ester possessing a viscosity of 150,000 centipoises at 25° C.

This product was neutralized and dispersed in water by the addition of 6.5 parts of diethylamine and 143.5 parts of deionized water per 100 parts of partial ester, and was pigmented with a 77 to 23 weight ratio of iron oxide to lead silico-chromate. The pigments were ground in the aqueous dispersions of the vehicle and the final composition was adjusted to a 0.4/1 pigment to vehicle solids ratio by weight by the addition of vehicle, and sufficient diethylamine and water were added to make a composition having 8 percent total non-volatile content and having a pH of 7.8.

EXAMPLE 6

Example 5 was repeated, except that 1000 parts of the product of the maleinized oil were treated with 447 parts of 2,2-bis(4-hydroxycyclohexyl)propane. Heating at 160° C. for two hours yielded a partial ester having a viscosity of 14,800 centipoises when dissolved in 4-methoxy-4-methylpentanone-2 at 80 percent non-violatile content.

EXAMPLE 7

A thermal interpolymer was prepared by heating a mixture of 650 parts of linseed oil and 350 parts of an unsaponifiable unsaturated hydrocarbon resin possessing an iodine value of about 180, a softening point of about 100° C., and a molecular weight range of about 1000 to 5000, derived from the polymerization of steam cracked olefins. The resin is mainly (e.g. 50 to 70 percent) polycyclopentadiene, with some polymerized alkyl cyclopentadiene and vinyl aromatic hydrocarbons. (This resin is known as "Piccodiene 9215"; other hydrocarbon resins that can be used in the same manner include the similar cyclopentadiene resins known as "LX" resins, one such being Neville LX685, which has a melting point of 110° to 130° C. and an iodine number of about 120. Others that can be used are known as "Panarez" resins, these being produced by the polymerization of olefiins and diolefins and having a softening point of 200 to 220° F.)

The mixture was heated at 285° C. for 1 hour, during which time a stream of inert gas was passed through the reaction mass to remove volatile constitutents. The product was cooled, 88 parts of maleic anhydride were added and this mixture was heated at 260° C. for 1 hour. Fifty parts of 2,2 - bis(4 - hydroxycyclohexyl)propane were then added and the reaction mass was cooled. The resultant polyol-modified product had a viscosity greater than 500,000 centipoises at 250° C.

EXAMPLE 8

Example 7 was repeated, except that the 2,2-bis-(4-hydroxycyclohexyl)propane was replaced by 72 parts of the hydroxypropyl di-ether of bisphenol A, resulting in a product of 900,000 centipoises viscosity.

EXAMPLE 9

Example 7 was repeated using 25 parts of 1,6-hexanediol in place of the 2,2-bis(4 - hydroxycyclohexyl)propane therein. The modified maleinized linseed oil interpolymer obtained had a viscosity of 190,000 centipoises at 25° C.

EXAMPLE 10

Example 7 was repeated, except that the thermal interpolymer was prepared from 400 parts of dehydrated castor oil, 400 parts of linseed oil, and 200 parts of the unsaturated hydrocarbon resin. The product had a viscosity of 120,000 centipoises at 90% non-volatile content in 4-methoxy-4-methyl-pentanone-2.

Water-dispersed compositions of the products of the above examples provided coatings of excellent properties when electrodeposited in the manner described herein. Among the properties attained were the ability to coat at high voltages for sustained periods without the adverse side effects often noted with unmodified products of the same class, as well as increased hardness and improved pigment wetting properties. This was illustrated, for example, by a series of tests in which each of the products of Examples 1 to 3 were dispersed in deionized water to 5 percent non-volatile content by the addition of diethylamine to a pH of approximately 8.5. Electrodeposition properties of each dispersion were determined by electrodepositing the composition at the constant maximum voltage obtainable without film rupture, for a period of 3 minutes at 75° F. The electrodes were two parallel 4 inch by 12 inch phosphatized sheet steel panels, two inches apart, immersed in the dispersion to a depth of 8 inches. After electrodeposition the films were rinsed with water and baked for 20 minutes at 250° F. For comparison, a composition prepared similarily except that there was used an unmodified maleinized linseed oil, made as in Example 1 but not modified with a polyol, was coated at the same conditions. The results are shown in Table I.

TABLE I

| | | Current | | Average film thickness | | |
| --- | --- | --- | --- | --- | --- | --- |
| Composition | Voltage | Initial amps | Final amps | Side toward cathode (mils) | Side away from cathode (mils) | Pencil hardness |
| Unmodified adduct | 40 | 1.5 | 1.0 | 0.45 | Only partially coated. | 2B |
| Example 1 | 150 | 1.25 | 0.3 | 0.35 | 0.3 (uniform) | H |
| Example 2 | 100 | 1.0 | 0.3 | 0.35 | 0.25 (uniform) | H |
| Example 3 | 60 | 1.25 | 0.75 | 0.65 | 0.05 (heavier on edges). | 2B |

It is apparent from the above results that the modification of the adduct with polyols markedly increased attainable electrodeposition voltages and resultant throwing power of the system, as measured by the uniformity of deposited film thickness irrespective of distance from the cathode. Harder films were also obtained.

Further demonstrating the improvement in throwing power attainable by the invention were tests such as one series in which the composition of the Example 5 and a similar composition made with the corresponding unmodified adduct were each electrodeposited on a 0.5 inch by 12 inch sheet steel anode suspended within an 11/16 inch diameter steel pipe of equivalent length. The anode assembly was immersed to a depth of 10 inches in the agitated composition, which was in a steel container used as the cathode. The bottom of the anode was 0.5 inch from the bottom of the container. Electrodeposition was carried out at the maximum voltage attainable without film rupture and at a bath temperature of 75° F. The coated strips were rinsed with water and baked at 350° F. for 20 minutes. Evaluation of the throwing power of the composition was made by measuring the height of coating from the bottom of the strip. Results are shown in Table II.

TABLE II

| Composition | pH | Voltage | Throwing power inches |
| --- | --- | --- | --- |
| Unmodified adduct | 7.6 | 200 | 4.75 |
| Example 5 | 7.8 | 230 | 6.625 |

As indicated, the composition of Example 5 give 50 percent improvement in throwing power over the corresponding composition containing the unmodified adduct.

As mentioned, the modified products herein also provide better pigment wetting with carbon black-containing pigment compositions, whereas serious problems of pigment flooding and the like are encountered with corresponding compositions and unmodified vehicles of this type.

Similar results are attained with the products of the other examples, as well as with like products made using other drying oil fatty acid esters, polyols and modifying materials as described above. Products modified with hydrocarbon resins gave especially good throwing power, and for this reason are especially desirable. For instance, the product of Example 7 was dispersed in water, neutralized with diethylamine and pigmented with a mixture of 95 percent iron oxide and 5 percent strontium chromate; the product had a pigment to vehicle ratio of 0.3 to 1, a total solids content of 10 percent and a pH of 9.2. When this product was electrodeposited in the manner of those of Table II, the voltage was 300 volts and the throwing power was 8 inches. Other products of this type gave similar results.

What is claimed is:

1. A method of coating an electrically conductive surface which comprises passing an electric current between said surface and an electrically conductive cathode, said surface and said cathode being in contact with a water-dispersed coating composition in which the resinous vehicle consists essentially of an at least partially neutralized ungelled reaction product of (1) an adduct of a drying oil fatty acid ester and at least one acidic compound selected from the group consisting of alpha, beta-ethylenically unsaturated carboxylic acids and their anhydrides, said adduct containing pendent anhydride groups derived from said acidic compound, (2) a polyol.

2. The method of claim 1 in which said polyol is a diol.

3. The method of claim 2 in which said diol is water insoluble.

4. The method of claim 1 in which said diol is 2,2-bis(4-hydroxycyclohexyl) propane.

5. The method of coating an electrically conductive surface which comprises passing an electric current between said surface and an electrically conductive cathode, said surface and said cathode being in contact with a water-dispersed coating composition in which the resinous vehicle consists essentially of an at least partially neutralized ungelled reaction product of
(1) an adduct of a drying oil fatty acid ester and at least one acidic compound selected from the group consisting of alpha, beta-ethylenically unsaturated carboxylic acids and their anhydrides, said adduct containing pedent anhydride groups derived from said acidic compound,
(2) an additionally ethylenically unsaturated component, and
(3) a polyol.

6. The method of claim 5 in which said additional ethylenically unsaturated component comprises one or more ethylenically unsaturated monomers.

7. The method of claim 5 in which said additional ethylenically unsaturated component is a polymerized or partially polymerized resin containing residual ethylenic unsaturation.

8. The method of claim 7 in which said resin is a hydrocarbon resin.

References Cited
UNITED STATES PATENTS

| | | | |
|---|---|---|---|
| 2,188,888 | 1/1940 | Clocker | 260—18CL |
| 2,033,132 | 3/1936 | Ellis | 260—18CL |
| 3,141,897 | 7/1964 | Crecelius | 260—18CL |
| 2,423,230 | 7/1947 | Eilerman | 260—18CL |
| 3,230,162 | 1/1966 | Gilchrist | 204—181 |
| 3,293,201 | 12/1966 | Shahade et al. | 260—18CL |
| 3,300,424 | 1/1967 | Hoenel et al. | 260—21 |
| 3,340,172 | 9/1967 | Huggard | 204—181 |
| 3,403,088 | 9/1968 | Hart | 204—181 |
| 3,412,056 | 11/1968 | Crawford et al. | 260—21 |

HOWARD S. WILLIAMS, Primary Examiner